United States Patent [19]

Choi

[11] Patent Number: 5,163,981
[45] Date of Patent: Nov. 17, 1992

[54] METHOD AND APPARATUS FOR CONTROLLING DISCHARGE OF POLLUTANTS FROM NATURAL GAS DEHYDRATORS

[75] Inventor: Michael S. Choi, Houston, Tex.

[73] Assignee: Conoco Inc., Ponca City, Okla.

[21] Appl. No.: 751,036

[22] Filed: Aug. 28, 1991

[51] Int. Cl.⁵ .................. B01D 47/06; B01D 53/14
[52] U.S. Cl. ........................... 55/32; 55/48; 55/50; 55/183; 55/189; 55/208
[58] Field of Search ............ 55/31, 32, 48–50, 55/183, 189, 208

[56] References Cited

U.S. PATENT DOCUMENTS

| | | | |
|---|---|---|---|
| 2,690,814 | 11/1950 | Reid | 55/32 |
| 2,812,827 | 6/1956 | Worley et al. | 55/32 |
| 2,812,830 | 4/1956 | Sattler et al. | |
| 3,212,238 | 5/1961 | Welch et al. | 55/208 |
| 3,331,188 | 1/1966 | Sinex | 55/31 |
| 3,367,089 | 4/1966 | Scott | 55/208 |
| 3,471,370 | 10/1969 | Jubin, Jr. | 55/32 X |
| 3,541,763 | 5/1968 | Heath | 55/185 |
| 3,616,598 | 11/1971 | Foral, Jr. | 55/32 |
| 3,736,725 | 6/1973 | Alleman et al. | 55/32 |
| 4,070,165 | 1/1978 | Colton | 55/30 |
| 4,280,867 | 7/1981 | Hodgson | 55/32 X |
| 4,314,891 | 2/1982 | Knobel | 55/32 X |
| 4,529,413 | 7/1985 | Ferguson | 55/32 |
| 4,674,446 | 6/1987 | Padilla, Sr. | 55/32 X |
| 4,676,806 | 6/1987 | Dean et al. | 55/32 X |
| 4,689,053 | 8/1987 | Heath | 55/32 X |
| 4,701,188 | 10/1987 | Mims | 55/32 X |
| 4,753,664 | 6/1988 | Honerkamp et al. | 55/32 X |

*Primary Examiner*—Robert Spitzer
*Attorney, Agent, or Firm*—Richard W. Collins

[57] ABSTRACT

A glycol dehydrator for removing water from produced natural gas includes a conduit for conveying uncondensed hydrocarbons from a reboiler overhead condenser to an auxiliary burner in the reboiler firetube by natural draft from the firetube flue stack.

6 Claims, 2 Drawing Sheets

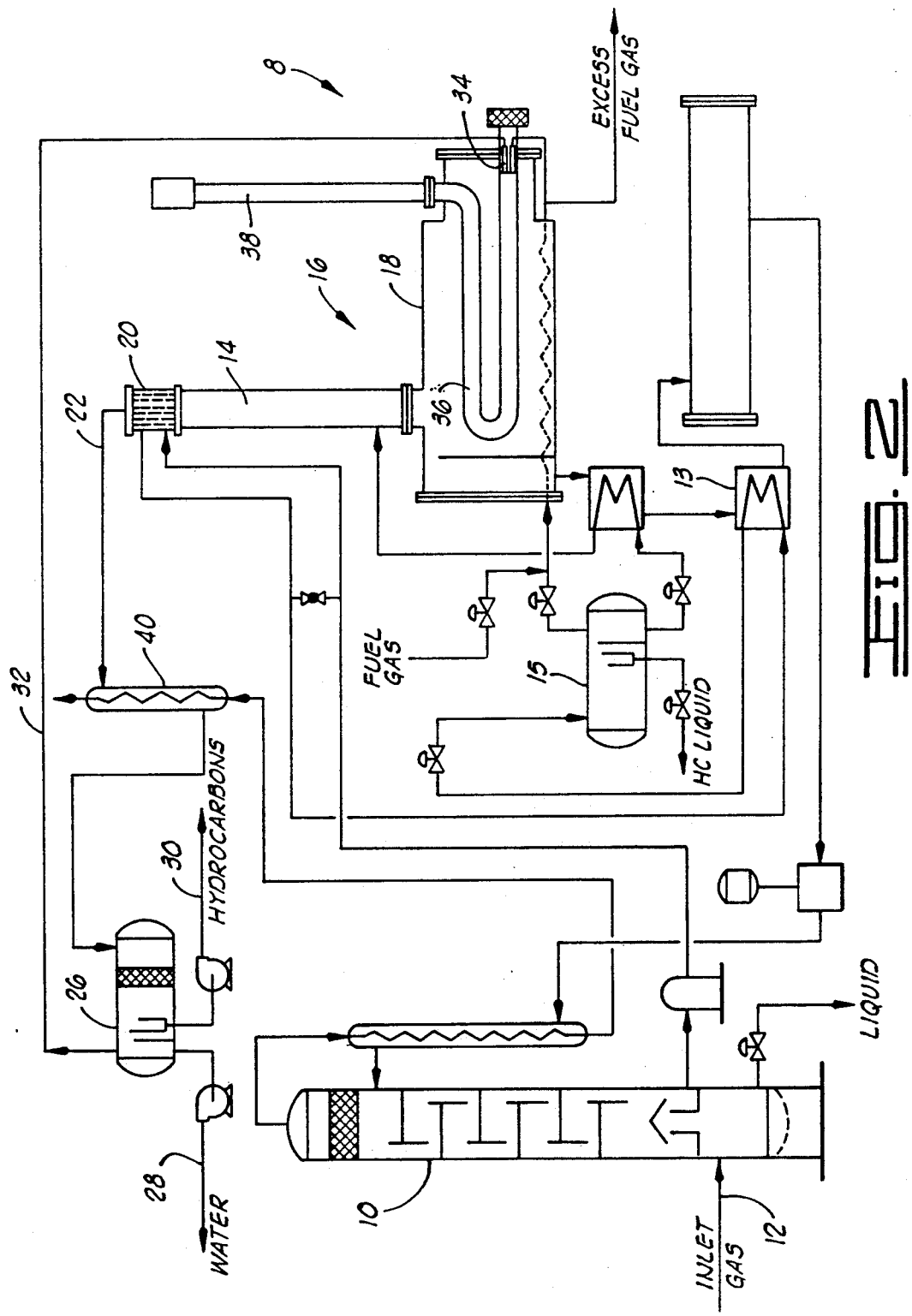

METHOD AND APPARATUS FOR CONTROLLING DISCHARGE OF POLLUTANTS FROM NATURAL GAS DEHYDRATORS

BACKGROUND OF THE INVENTION

This invention relates to a method and apparatus for controlling hydrocarbon emission from glycol dehydrators in natural gas service.

Natural gas flowing from natural gas wells typically contains water vapor, condensible hydrocarbons and entrained liquids such as water droplets and oil droplets. It is common practice to condition the natural gas at a wellhead to remove these materials from the gas before it passes into the gas pipeline leading from the well. Such removal is necessary in order (1) to prevent clogging of pipelines with liquid water and liquid hydrocarbons which separate as a result of the lower temperatures existing in the transport system; (2) to prevent formation of hydrates which also can clog the system; and (3) to prevent corrosion of pipelines, tanks and other components of the system. The principles of such conditioning operations are well known. Water droplets are frequently removed by any of a variety of mechanical gas-liquid separators. Condensible hydrocarbons and additional water are generally removed by expanding the high pressure well gas so that the resulting temperature drop causes condensation of the condensibles, the condensed liquids being readily separated from the non-condensed gas. Subsequent dehydration of the gas is most commonly achieved by contacting it with a hygroscopic liquid, i.e. a liquid desiccant or absorbent such as diethylene or triethylene glycol, whereupon the water vapor is absorbed into the liquid desiccant. The desiccant is then regenerated by heating it to drive off water, and the resulting concentrated desiccant is recycled to the dehydration step. The heat required for regeneration is obtained by burning a portion of the natural gas.

Two of the essential pieces of equipment used for natural gas conditioning are a separator and a dehydrator, the former removing entrained liquids and condensibles and the latter removing water vapor. These are often separate pieces of equipment, but they may be combined in a single separator-dehydrator unit. The separator unit or separator section of a combined unit includes an expansion valve or choke for the natural gas and typically a stratification type water-hydrocarbon separator. The dehydrator unit is in principle a gas-liquid contact tower in which the wet gas is brought into intimate contact with strong glycol. The regenerator or reboiler is a separate unit usually in the form of a distillation column or the equivalent.

Examples of systems for conditioning raw natural gas at the well site to remove liquid components, condensibles and water vapor are described in a number of U.S. patents including U.S. Pat. Nos. 2,690,814; 2,812,827; 2,812,830; 3,212,238; 3,331,188; 3,367,089; 3,541,763 and 4,070,165.

SUMMARY OF THE INVENTION

The primary object of the present invention is to totally eliminate discharge of hydrocarbons, including aromatic hydrocarbon pollutants (benzene, toluene, xylene, etc.), from glycol dehydrators in natural gas service.

Prior art glycol dehydrators typically condense regenerator reflux condenser effluent and separate it into water and hydrocarbon streams. The uncondensed vapors are typically exhausted to the atmosphere. See, for example, FIG. 1 of U.S. Pat. No. 3,736,725 and FIG. 1 of U.S. Pat. No. 4,708,721. The uncondensed vapors in many cases include aromatic hydrocarbons which are objectionable from an environmental viewpoint.

It is an object of this invention to provide a method and apparatus for completely eliminating release of aromatic hydrocarbons from such units. This is accomplished by providing an external condenser on the effluent line from a glycol regenerator, and then conveying any uncondensed material, including aromatic hydrocarbons, to a burner in the reboiler section of a glycol regenerator for combustion of the hydrocarbons. In this way, the only material exhausted to the atmosphere is the combustion products from the reboiler flue gas.

BRIEF DESCRIPTION OF THE DRAWINGS

FIG. 2 is a schematic flowsheet illustrating an alternative embodiment of the invention.

DESCRIPTION OF THE PREFERRED EMBODIMENT

Figure 1:
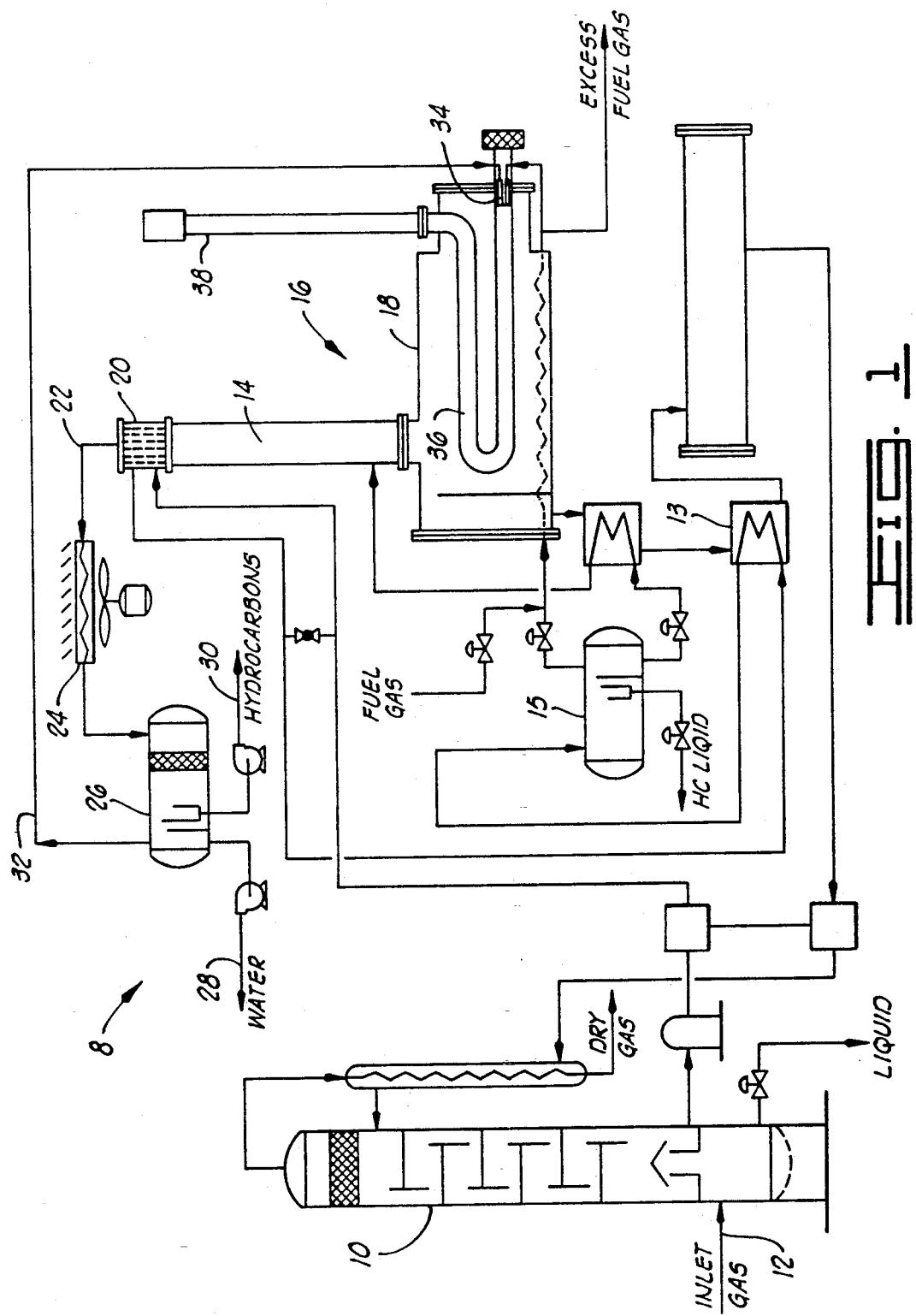
FIG. 1 is a schematic flowsheet illustrating one embodiment of the invention.

FIG. 1 is a schematic illustration of a typical glycol dehydrator unit (8) including a contactor tower (10) in which produced natural gas from inlet (12) is contacted with glycol for removal of moisture and hydrocarbons absorbable by the glycol, including any aromatic hydrocarbons present in the gas stream. The glycol from contactor tower (10) preferably is preheated with lean glycol in exchanger (13) and then flashed in low pressure separator (15) before it passes to the still section (14) of regenerator (16) where it is heated by reboiler (18) to drive off water and absorbed hydrocarbons. The flash gas from separator (15) may be used as fuel in the reboiler. Also, separator (15) removes hydrocarbon liquids from the rich glycol stream and prevents overloading of the condenser downstream of the reboiler. A reflux condenser (20) at the top of still section (14) controls the glycol concentration in the effluent from the still section (14).

As shown in FIG. 1, overhead vapors from reflux condenser (20) pass via line (22) to air-cooled condenser (24) where water and condensible hydrocarbons are condensed out. The condensed water and hydrocarbons are separately recovered from condensate separator (26) via lines (28) and (30), respectively. As a critical part of the invention, non-condensibles from condensate separator (26) are conveyed by natural draft via line (32) to an auxiliary burner (34) in the firetube (36) of reboiler (18). The natural draft created by combustion in firetube (36) and combustion gas flow in flue stack (38) pulls non-condensibles from condensate separator (26) without the requirement of any added equipment. Essentially all of the non-condensed hydrocarbons, including any aromatic hydrocarbons present, are combusted in firetube (36) such that the only emission from the unit is the combustion products exiting via flue stack (38)

FIG. 2 is a schematic illustration of another embodiment of the invention similar in most respects to the unit shown in FIG. 1 but having a gas-cooled condenser (40) instead of the air-cooled condenser shown in FIG. 1. Condenser (40) uses dry gas from contactor (10) as the cooling medium to condense overhead vapors from line 22. The remainder of the unit is essentially the same as the FIG. 1 unit previously described.

The water product stream from line (28) may contain enough dissolved aromatic hydrocarbons that it cannot be casually disposed of, and may need either to be treated or placed in an appropriate disposal well. The hydrocarbons from line (30) may be combined with oil production from the reservoir.

The overall result of carrying out this invention is that essentially no hydrocarbons are released to the atmosphere. This is in contrast to existing glycol dehydrator units which typically dump condensed water (containing small amounts of hydrocarbons) from the regenerator overhead, and in addition exhaust non-condensed hydrocarbons into the atmosphere.

What is claimed is:

1. In a method for removing water from produced natural gas wherein said natural gas is contacted with a countercurrent glycol stream which absorbs water from said natural gas stream, and said glycol stream containing absorbed water is regenerated in a regenerator having a reboiler section and a reflux condenser, the improvement comprising:
   (a) passing overhead vapor from said reflux condenser to a vapor condenser;
   (b) passing effluent from said vapor condenser to a condensate separator;
   (c) recovering condensed water and condensed hydrocarbons from said condensate separator; and
   (d) conveying non-condensible hydrocarbon vapors from said condensate separator to an auxiliary burner in a firetube in said reboiler section where said hydrocarbon vapors are combusted, said hydrocarbon vapors being conveyed to said burner by natural draft created by combustion gas flow in a flue stack extending from said firetube, whereby the only gaseous environmental discharge from said still and reboiler section is comprised of combustion products from said flue stack.

2. The method of claim 1 wherein said overhead vapor is cooled in said vapor condenser by air-cooling.

3. The method of claim 1 wherein said overhead vapor is cooled in said vapor condenser by heat exchange with dry gas which has been dried by contact with said glycol.

4. In a glycol dehydrator apparatus for removing water from produced natural gas comprising a gas/glycol contactor, a glycol regenerator means including a still having a stripping section and a reflux condenser, and said regenerator means also including a reboiler section having a firetube therein and a flue stack extending therefrom, the improvement comprising:
   (a) an overhead vapor condenser downstream from said reflux condenser;
   (b) a condensate separator downstream from said vapor condenser and having separate outlets for condensed water, condensed hydrocarbons and uncondensed hydrocarbons;
   (c) a conduit extending from the condensate separator outlet for uncondensed hydrocarbons directly to said firetube; and
   (d) an auxiliary burner in said firetube fueled by said uncondensed hydrocarbons, said conduit, auxiliary burner, firetube and flue stack being arranged such that the natural draft of combustion gases exiting said flue stack provides the motive force for conveying said hydrocarbon vapors to said auxiliary burner.

5. The apparatus of claim 4 wherein said overhead vapor condenser is an air-cooled condenser.

6. The apparatus of claim 4 wherein said overhead vapor condenser is a heat exchanger cooled by dry gas from said gas/glycol contactor.

* * * * *